United States Patent [19]

Aossey

[11] Patent Number: 4,551,713
[45] Date of Patent: Nov. 5, 1985

[54] PET DOOR MAT ALARM

[76] Inventor: Joseph W. Aossey, 2245 Birchwood Dr., N.E., Cedar Rapids, Iowa 52402

[21] Appl. No.: 461,936

[22] Filed: Jan. 28, 1983

[51] Int. Cl.4 ............................................. G08B 21/00
[52] U.S. Cl. .................................... 340/666; 340/573; 200/85 R; 200/86 R
[58] Field of Search ....................... 340/666, 667, 573; 200/85 R, 86 R

[56] References Cited

U.S. PATENT DOCUMENTS 4,401,896 8/1983 Fowler et al. .................. 340/666 X

FOREIGN PATENT DOCUMENTS 968211 9/1964 United Kingdom ................ 340/666
2064222 6/1981 United Kingdom ................ 340/666

OTHER PUBLICATIONS

*Popular Science*, May 1952, p. 194.

Primary Examiner—James L. Rowland
Assistant Examiner—Chi K. Lau
Attorney, Agent, or Firm—Warren H. Kintzinger

[57] ABSTRACT

A low voltage battery powered door mat alarm having an alarm buzzer circuit with mat circuit contact closure by the weight of the pet such as a cat walking across the mat to or from an animal pet door. This activates the buzzer to indicate generally that the pet is approaching the door to go out or has just returned through the pet door with the mat positioned just inside the door so the pet must pass over the mat to go out or come in through the door.

3 Claims, 3 Drawing Figures

U.S. Patent        Nov. 5, 1985        4,551,713
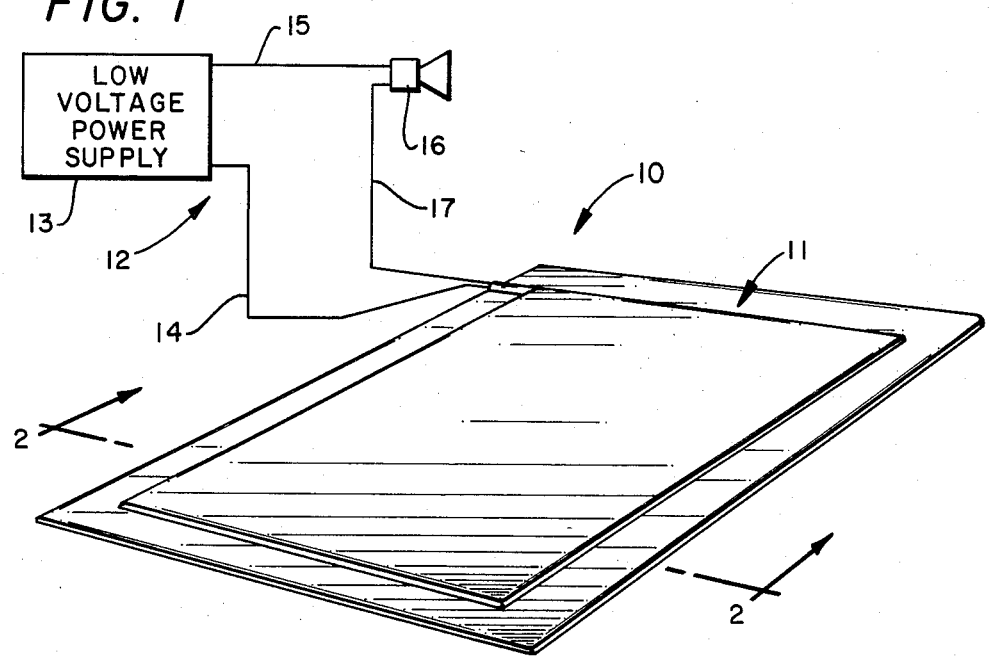
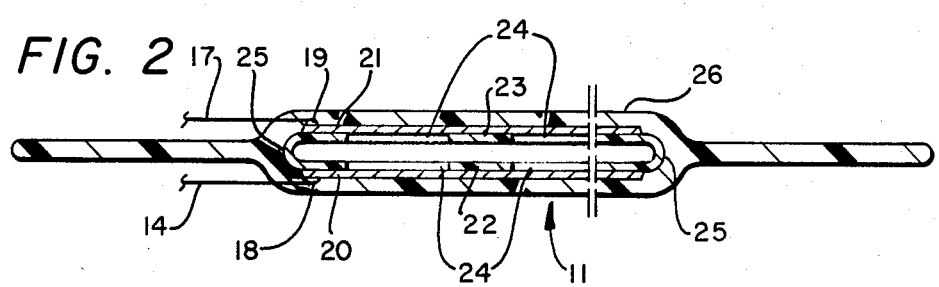
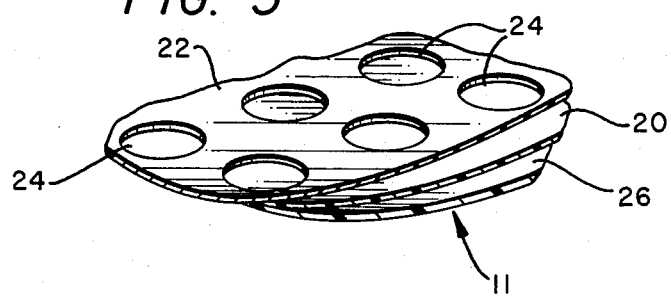

PET DOOR MAT ALARM

This invention relates in general to animal triggered alarm devices, and more particularly to a pet door mat alarm subject to activation by a pet walking across the mat to or from an animal door that the animal uses to got out or come in.

A pet owner such as a cat owner many times likes to keep track of the pet and having an alarm indicator when the pet is going out or coming in would be quite helpful. This may be accomplished by having an alarm door mat positioned in the path of the pet going out or coming in. Such a mat may be placed on the floor of a constricted passageway to give an indication of animal movement through the passageway.

It is, therefore, a principal object of this invention to be given an indication when a pet is going to a pet door or when the pet has gone through the door.

Another object is for such an indication, or alarm, to be provided by passage of the animal over a mat.

A further object is to provide reliable indication of animal movement through a passageway.

Features of the invention useful in accomplishing the above objects include, in a pet door mat alarm, a low voltage battery powered door mat alarm system circuit having an alarm buzzer activated by circuit contact closure in the door mat by weight of a pet, such as a cat, walking across the mat to or from an animal pet door, or through a passageway with a mat therein to have an indication of animal movement therethrough. The mat includes two contact sheets of conductive material connected as opposite sides of a switch and normally held apart by resiliently deflectable plastic sheeting having openings therein to permit contact closure as an animal walks over the mat.

A specific embodiment representing what is presently regarded as the best mode of carrying out the invention is illustrated in the accompanying drawing.

In the drawing:

FIG. 1 represents a combination perspective and schematic showing of a low voltage power supply fed door mat switch equipped alarm buzzer, or indicator, equipped circuit;

FIG. 2, a partial cut-away and sectioned view of the pet door mat generally along line 2—2 of FIG. 1; and, FIG. 3, a small partial cut-away and sectioned view illustrating additional pet door mat alarm circuit structure detail.

Referring to the drawing:

The pet door mat alarm 10 of FIG. 1 is shown to be part of a mat 11 activated alarm circuit 12 including a low voltage power supply 13, such as a battery, having a line 14 connected to mat 11 and a line 15 connected to an alarm device 16 in the form of a buzzer or horn and through the alarm device 16 and line 17 to mat 11. Referring also to FIG. 2 wire lines 14 and 17, that are insulated wire leads, have end connections 18 and 19, respectively, to electrically conductive material sheets 20 and 21. The electrically conductive material sheets 20 and 21 are normally held apart by resiliently deflectable plastic sheets 22 and 23 having relatively large openings 24 to permit contact closure between conductive sheets 20 and 21 through the openings as an animal walks over the mat 11. The resiliently deflectable plastic sheets 22 and 23 may be joined together at their edges with resiliently deflectable plastic edges interconnect walls 25 that aid in holding plastic sheets 22 and 23 in mutually spaced relation except when deflected together by the weight of an animal on the mat 11. The electrically conductive material sheets 20 and 21 and the resiliently deflectable plastic sheets 22 are enclosed in assembled form within a moisture water-proof plastic envelope like enclosure 26 through which electric lines 14 and 17 extend to their end terminal connections 18 and 19 with electrically conductive material sheets 20 and 21. The partial cut-away and sectioned perspective view of FIG. 3 shows some detail of the conductive sheet 20 and plastic sheet 22 with openings 24 and enclosure 26 with the opposite upper side lifted away.

Whereas this invention has been described with respect primarily to one embodiment thereof, it should be realized that various changes may be made without departing from the essential contributions to the art made by the teachings hereof.

I claim:

1. A floor mat indicator for indicating a mat depressing weight thereon such as an animal passing thereover comprising: first and second electrical conductive means connectable to an electric circuit; resiliently deflectable structural means normally holding said first and second conductive means apart yet resiliently deflectable by pressure to permit said first and second conductive means to come into electrical conductive contact one with the other; and an electrical non-conductive enclosure enclosing said first and second conductive means, and said resiliently defectable stuctural means; wherein said first and second electrical conductive means are first and second conductive material sheets having electrical connections respectively to first and second electrical line leads extended through said electrical non-conductive enclosure from the interior to the exterior thereof; said resiliently deflectable structural means normally holding said first and second means apart is two planar sheets of electrically insulative plastic that alone hold said first and second electrical conductive material sheets apart yet permit electrical conductive contact between said conductive material sheets when sufficiently resiliently deflected as by an animal walking across said floor mat indicator; with said first and second electrical conductive material sheets positioned to the outside of said two planar sheets of plastic; with said two planar sheets of plastic joined together around their peripheral edges; and wherein openings are provided in said two planar sheets of electrically insulative plastic to permit electrically conductive contact between said conductive material sheets when said two planar sheets of electrical insulative plastic are resiliently deflected together and said first and second conductive material sheets are brought into mutual contact at some location through the general planar extent of said first and second conductive material sheets as would be occasioned by an animal walking across the floor mat.

2. The floor mat indicator of claim 1, wherein said floor mat has electric circuit connection from said first and second electrical conductive material sheets through said first and second electrical line leads to and through a power supply and a signal indicator.

3. The floor mat indicator of claim 2, wherein said signal indicator is a noise generating device subject to generating noise when electric current is passed therethrough.

* * * * *